(No Model.) 4 Sheets—Sheet 1.

E. A. NEWMAN.
THERMO ELECTRIC APPARATUS FOR CONTROLLING THE TEMPERATURE OF WATER IN PIPES.

No. 383,536. Patented May 29, 1888.

Witnesses
H. C. Newman
C. M. Newman

Inventor.
Edwin A. Newman
By his Attorneys
Baldwin Hopkins & Peyton (No Model.) 4 Sheets—Sheet 2.

E. A. NEWMAN.
THERMO ELECTRIC APPARATUS FOR CONTROLLING THE TEMPERATURE OF WATER IN PIPES.

No. 383,536. Patented May 29, 1888.

Witnesses
H. C. Newman
E. M. Newman

Inventor
Edwin A. Newman
By his Attorneys
Baldwin Hopkins & Peyton (No Model.) 4 Sheets—Sheet 3.

E. A. NEWMAN.
THERMO ELECTRIC APPARATUS FOR CONTROLLING THE TEMPERATURE OF WATER IN PIPES.

No. 383,536. Patented May 29, 1888.

Witnesses:
H. C. Newman,
O. M. Newman,

Inventor,
Edwin A. Newman,
By his Attorneys
Baldwin Hopkins & Peyton.

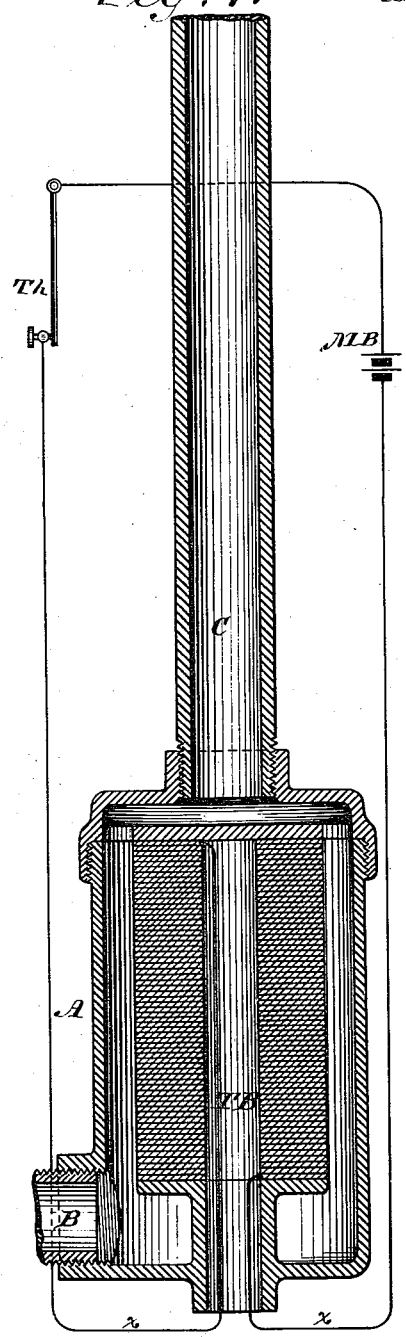
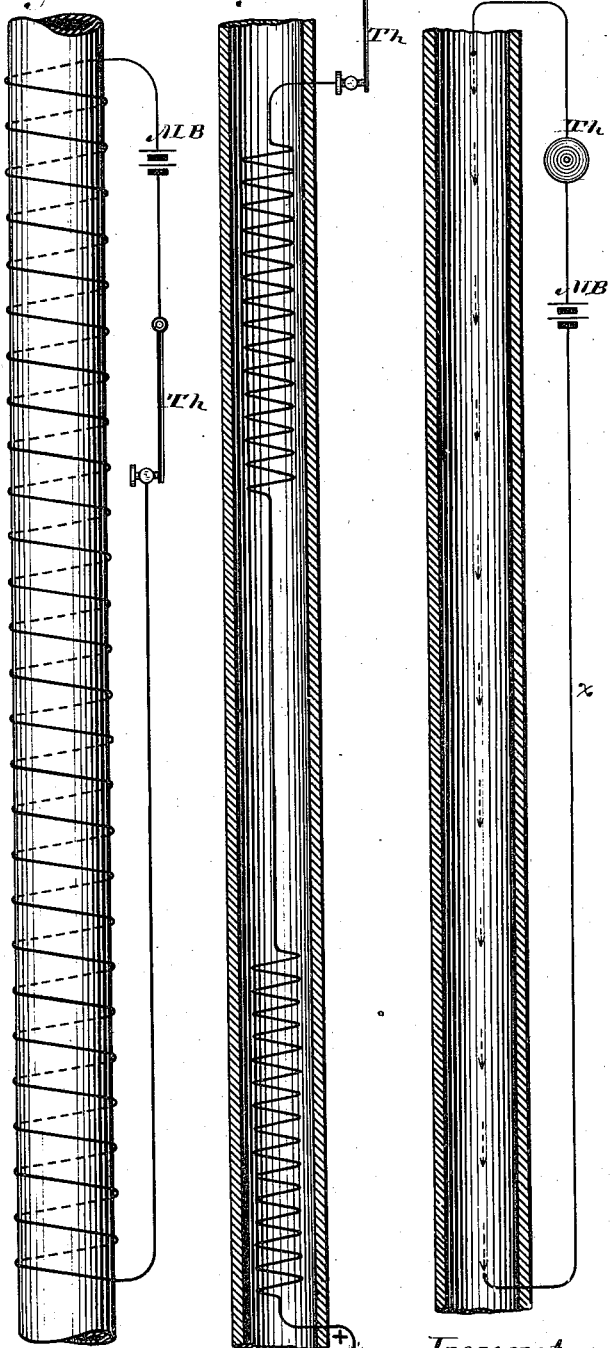

UNITED STATES PATENT OFFICE.

EDWIN A. NEWMAN, OF WASHINGTON, DISTRICT OF COLUMBIA, ASSIGNOR TO THE NEWMAN ANTI-FREEZING WATER PIPE COMPANY, OF CHICAGO, ILLINOIS.

THERMO-ELECTRIC APPARATUS FOR CONTROLLING THE TEMPERATURE OF WATER IN PIPES.

SPECIFICATION forming part of Letters Patent No. 383,536, dated May 29, 1888.

Application filed December 30, 1887. Serial No. 259,424. (No model.)

*To all whom it may concern:*

Be it known that I, EDWIN A. NEWMAN, a citizen of the United States, residing at Washington, in the District of Columbia, have invented certain new and useful Improvements in Thermo-Electric Apparatus for Controlling the Temperature of Water in Pipes, of which the following is a specification.

The general object of my invention is to provide apparatus for controlling the temperature of water in pipes.

My special object is to provide improved means for preventing the pipes from freezing.

To this end my invention consists in improved apparatus for heating the pipes at one or more points.

Figure 1:
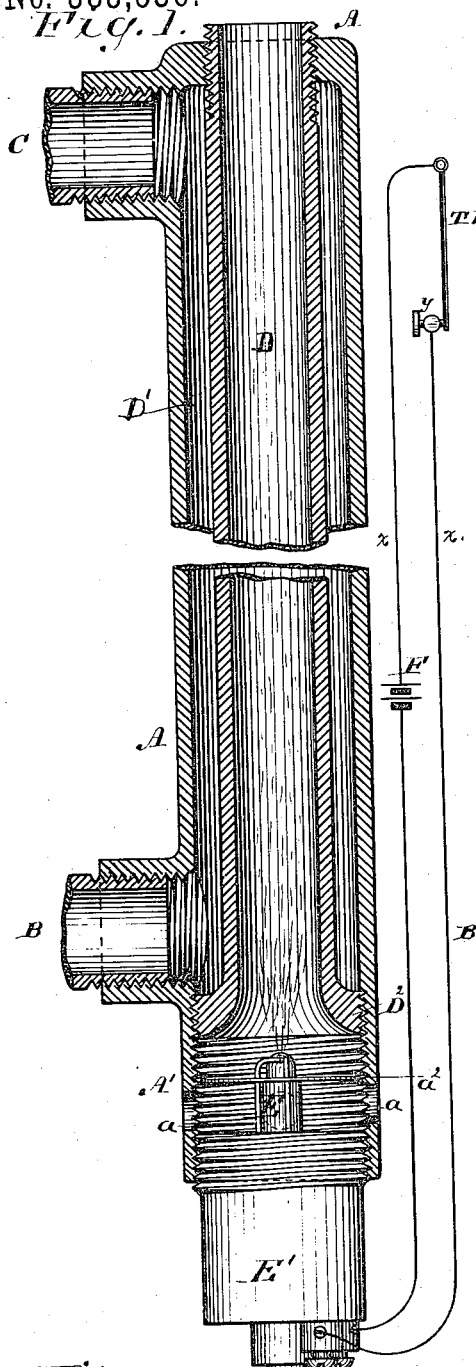
Figure 2:
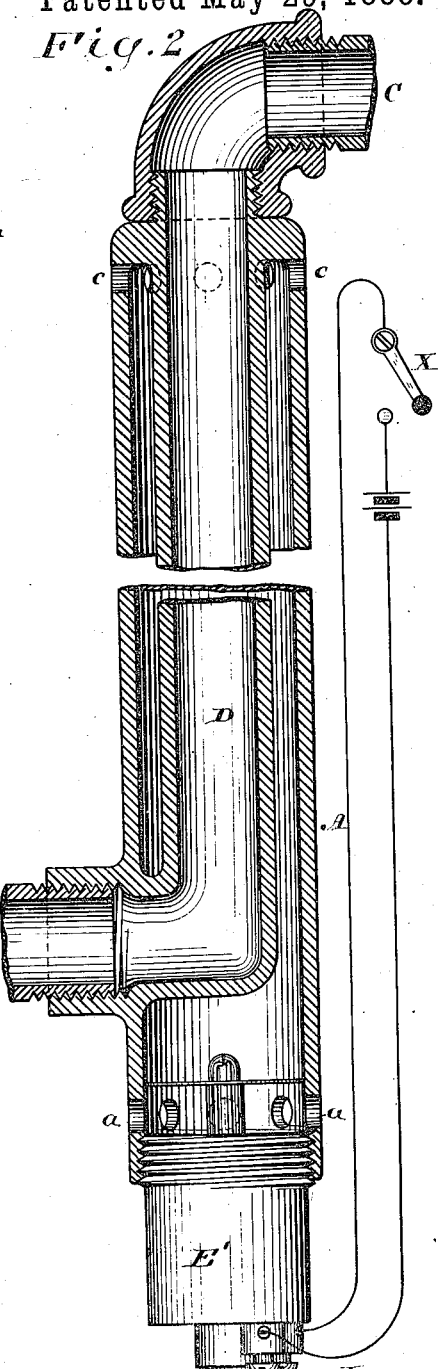
Figures 3, 4:
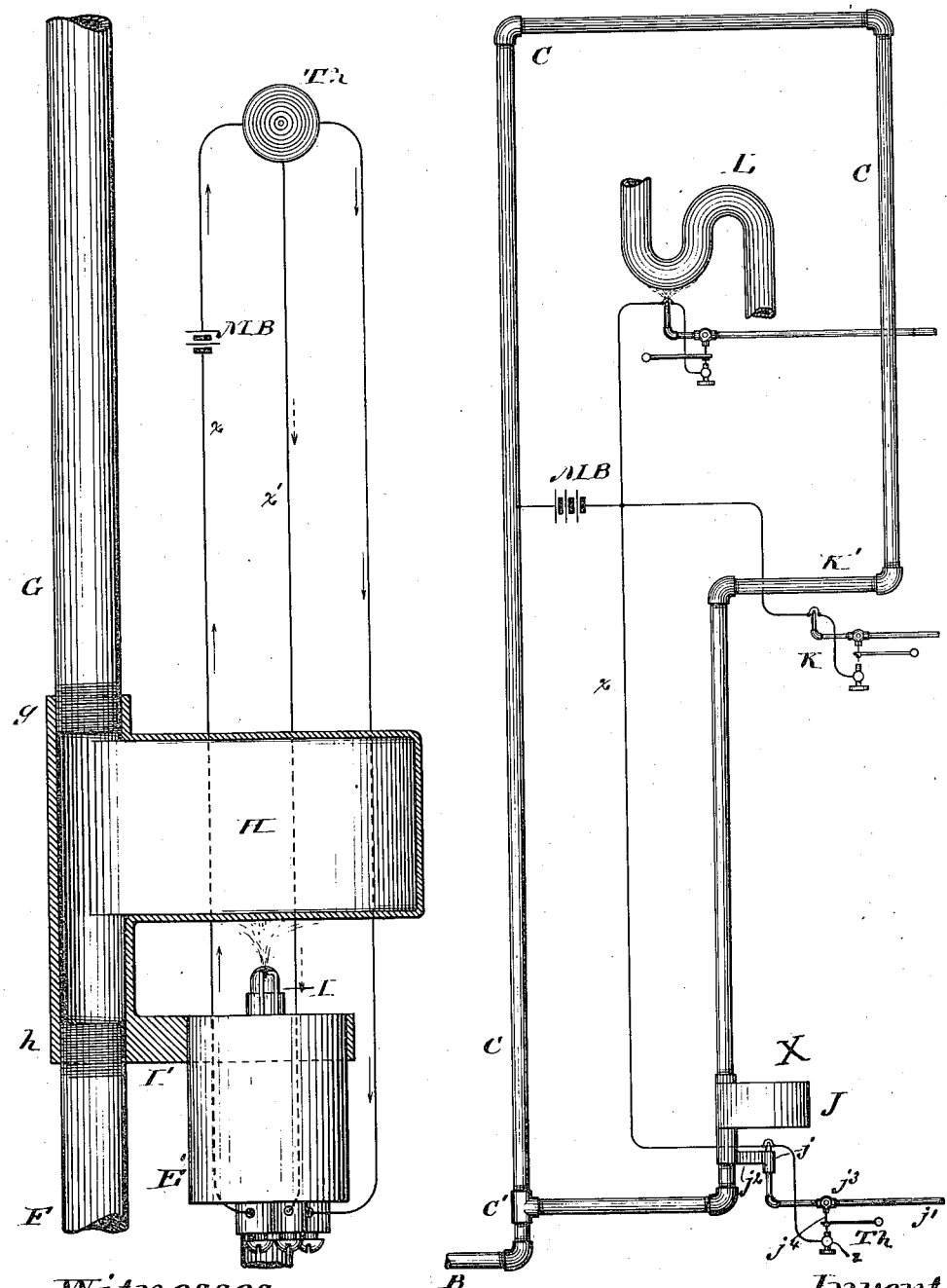
Figure 5:
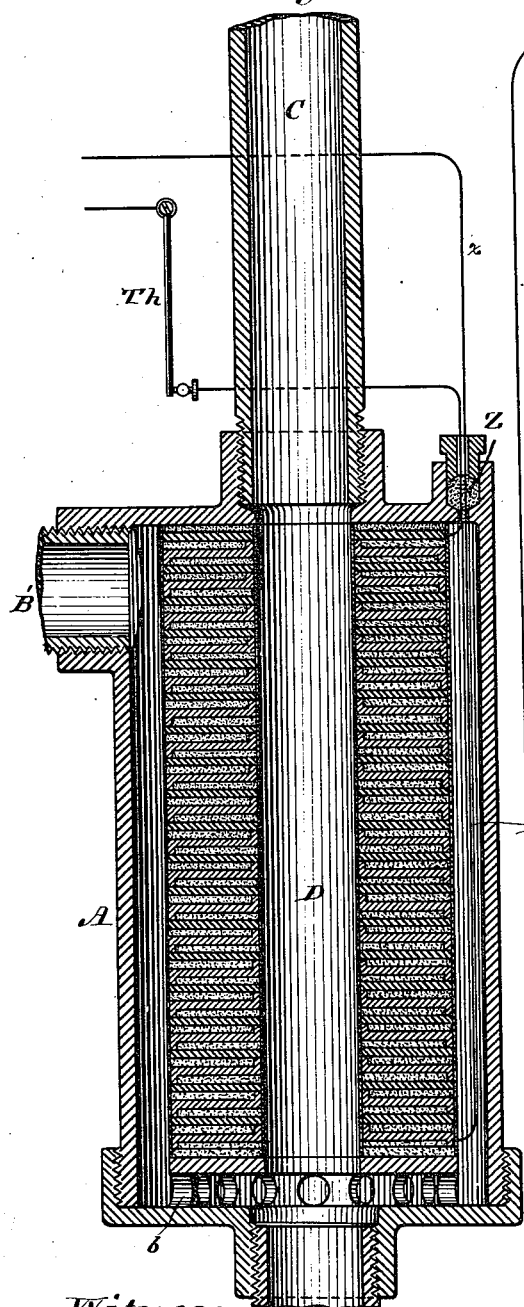
Figure 6:
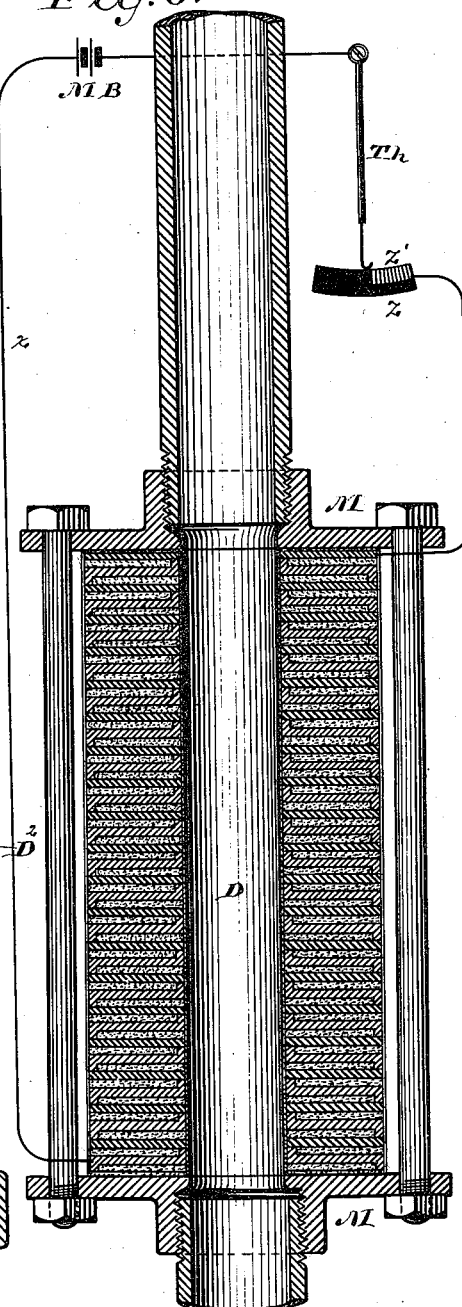

In the accompanying drawings, Figure 1 is a section of a water-pipe with one form of my improved apparatus applied for heating the pipe. Fig. 2 is a section of a pipe, showing a modified form of my improved apparatus. Fig. 3 is an elevation, partly in section, of another form of apparatus, showing modifications. Fig. 4 is a diagram view of a pipe system, showing another way of employing my improved apparatus. Fig. 5 is a sectional view showing a water-pipe with a thermal battery arranged to heat the water in a part of the pipe system. Fig. 6 is a modification of the pipe system. Fig. 7 shows a further modification, in same. Fig. 7 shows a further modification, in which a thermal battery is employed to heat the water in the pipe system. Fig. 8 shows a section of pipe with a coil or solenoid around it, connected with a battery and thermostat, for the purpose of heating the pipe. Fig. 9 shows coils of wire within a pipe connected with an electric circuit for the purpose of heating the water in the pipe. Fig. 10 shows a section of pipe and an electric circuit, in which the water in the pipe, or the pipe itself, forms part of the circuit.

Referring to Fig. 1, A indicates a section of pipe provided with an inlet-opening, B, and a discharge-opening, C. The opening B may connect with a water-main and the opening C with the service-pipes of a building. Within the pipe A is arranged a tube or pipe, D, of smaller diameter than the pipe A, so arranged as to form a water-chamber, D', between the pipe A and the pipe D. At the top the pipe D is secured to the top of the pipe A, forming a water-tight joint. The bottom of the pipe D is preferably enlarged at $D^2$ and secured to the pipe A by a screw-threaded connection, as shown. In a downwardly-projecting portion, A', of the pipe A is arranged a gas-burner, E, which is provided with an automatic electrical apparatus, E', for turning on and lighting the gas. This apparatus is of well-known construction and needs no specific description, any apparatus for the purpose being applicable in this connection. The pipe A' is perforated at $a$, as shown, to admit air to the gas-burner. Just over the perforations and just under the end of the gas-burner is arranged a perforated disk, $a^2$. This arrangement admits free access of air to the burner, but prevents gas-flame from escaping through the ventilating-perforations. The bottom of the pipe D is preferably flared, as shown, just over the gas-burner, and its top is open. F indicates a battery; T$h$, a thermostat, and $x$ circuit-wires running from the battery to the electrical apparatus for turning on and lighting the gas and through the thermostat. The thermostat may be so adjusted as to turn on and light the gas at any predetermined condition of temperature—that is, if it is desired to have the apparatus arranged to prevent water-pipes from freezing, the thermostat may be adjusted to close the circuit at the contact $y$, when the thermometer is below the freezing-point. When the circuit is so made, the gas will be turned on and lighted at the burner E, and the heated air and products of combustion will pass up through the pipe D, thereby heating it and the surrounding water in the chamber D'. Water entering at the opening B will first enter the chamber D', and will there be heated before it passes into the service-pipes through the opening C; or if the water is stationary in the pipes the water surrounding the pipe D will be heated, and will distribute itself through the pipe system, thereby causing a circulation through the pipes, and causing the temperature of the water throughout the whole pipe system to be increased.

In Fig. 2 I have shown a somewhat similar apparatus. I employ the same form of electrical apparatus for turning on and lighting the gas; but instead of having an interior pipe through which the heat passes, I make the outside pipe, A, the conduit for the heat, and the water-pipe is arranged within the pipe A. The entrance B may be connected with the water-main and the opening C with the service-pipes of a building. Any suitable couplings or joints may be employed, preferably those indicated in the drawings. The pipe or casing A, near its top, is provided with openings c, through which the products of combustion and the heated air may escape. The air enters at a, near the gas-burner, and feeds the gas-flame. The heated air and products of combustion pass up through the pipe or casing A, around the water-pipe D, and out through the opening c. The water in the pipe D will be heated, and will cause a circulation and distribution of heat in a manner similar to that described in connection with Fig. 1. Instead of employing the thermostat as shown in Fig. 1, I have shown a hand-switch, X; but I may employ a thermostat in connection with this apparatus, or may employ a hand-switch in connection with the apparatus shown in Fig. 1, as may be desired.

In Fig. 3, F indicates a pipe which may be connected with the water-main; G, a pipe which may be connected with the service-pipes of a building, and H a box or tank connected at h in any suitable way to the pipe F and at g to the pipe G. The box or tank H is preferably arranged to project at right angles from the pipes F and G over a gas-burner, I, which is supported in a bracket, I'. The gas-burner is provided with an electrical apparatus for automatically turning on and lighting the gas. Th indicates a thermostat which is connected with a battery, M B, and circuit-wires x lead from the battery through the thermostat and electrical apparatus to battery again, and a circuit-wire, x', leads from the thermostat to another binding-post of the electrical apparatus. In this instance the thermostat is arranged to make one circuit when the temperature is low, and to make another circuit when it is high—that is, suppose the thermostat be arranged to close an electric circuit through the gas-lighting apparatus E' when the temperature is low. In the drawings the gas is shown as lighted, and if the temperature rises above a predetermined point the contacts at the thermostat will shift and close the circuit through suitable apparatus for turning off the gas. The water entering through the pipe F fills the box or tank H and the service-pipes through pipe G. The water in the box H is heated by the gas-burner I, and will cause a circulation in the pipes and a distribution of heat that is now well understood.

In Fig. 4, B indicates a pipe leading to the water-main, and C the service-pipes of a building, which are shown suitably coupled and connected at C'. In this arrangement it will be noticed that water entering from B may pass up through the upright pipe at the left of the figure and fill the pipes on the right hand side of the figure and connect again at C'. At suitable intervals in the pipe system I have arranged an apparatus for heating the water in the pipe. At X, I have shown a box or tank, J, similar to that shown in Fig. 3. A gas-pipe, j', having a burner, j, is arranged under the box or tank J on a suitable bracket, j². The gas-cock j³ is provided with a spindle, j⁴, which is secured to a thermostat, Th, adapted to make and break contact with a contact-screw, z. M B indicates a battery, which is connected with the pipes of the system and by circuit-wire x with the contact z of the thermostat, first passing over the gas-burner j, where it is provided with a suitable device for igniting the gas. This apparatus is so arranged that when the temperature falls the thermostat will move so as to withdraw the valve-stem j⁴ and turn on the gas, at the same time closing an electric circuit at the contact z. The circuit will then run from battery M B by circuit-wire x to contact z, and from contact z to the thermostat, and from thermostat to the pipes (the thermostat being connected to ground or to the pipes.) The gas will thus be ignited and will heat the water, as before explained. When the temperature rises again, the thermostat will move back, break the circuit and shut off the gas. At K the gas-burner is arranged under a section of pipe, K'. The apparatus for turning on the gas and lighting it is similar to that shown at X, and needs no further description. It is similarly connected with the battery M B. L indicates a water-trap with a gas-burner arranged under the bend of the trap to heat it and prevent water standing in the trap from freezing. The apparatus for turning on and igniting the gas is similar to that just explained. In this arrangement a circulation of water may be carried on around the pipes—that is, the heated water may rise from the heated sections, pass up into the pipe system, down again through opposite pipes, and then again into the heated sections.

Referring now to Fig. 5, A indicates a casing provided with an opening, B, which may be connected with a water-main, and C a pipe which may be connected with the service-pipes of a building. The pipe C and the opening B are connected by a tubular passage, D. Around the tubular passage D, and within the casing A, is arranged a thermal battery of any suitable kind. The elements of the battery are suitably insulated from the casing, as shown, and a space, D², is provided between the outer surface of the battery and the casing A. An opening, B', leads to the vacant space D², so that water passing through the service-pipes of a building may return again to the casing A through the opening B' and back again through the tubular passage D through openings b. An electric circuit, x, connects with the thermal battery, passing through suitable packing, Z, in the casing A. A thermostat, Th, is included in the electric circuit, and is arranged to make and break contact according to the condition of temperature. It is well known that if a current of electricity be sent through a thermal battery it will produce heat on one side of the battery and cold on the other. I have arranged the battery so that heat will be produced on the side of the battery in proximity to the tubular passage D and cold on the outside surface of the battery. If the circuit is made at the thermostat, the tubular passage D will be heated and water passing through said passage will have heat imparted to it.

In Fig. 6 I have shown a thermal battery arranged around the tubular water-passage D, the thermal battery being supported between disks M, which are bolted together, as shown. In this instance there is no casing around the outer surface of the thermal battery. An electric circuit, $x$, including a thermostat, Th, and battery M B, is suitably connected with the thermal battery to produce heat on the inner ends of the elements next the tubular passage D. The thermostat is shown as provided with a contact, $z$, consisting of a series of resistance-blocks, $z'$, over which the contact-finger of the thermostat slides. As the thermostat is moved more or less, a corresponding amount of current will flow—that is, if the temperature is not very low and the contact-finger moves onto only one of the resistance blocks, only a small current will flow, and a corresponding amount of heat produced in the thermostat; but when it is very cold the thermostat will move across several of the resistance-blocks and throw on a large amount of current. A thermostat with a sliding contact similar to that just described may be used in connection with the apparatus shown in other figures of the drawings.

In Fig. 7, A indicates a casing; B, a connection between the casing and the water-main; C, a connection between the casing and the service-pipes. Within the casing is arranged the thermal battery T B, which is provided with a water passage or casing around its exterior surface. A circuit, $x$, including a thermostat, Th, and battery M B, are connected with the thermal battery in any suitable way to produce cold on the inside of the elements and heat on the exterior surface, so as to heat the water in the space between the casing and the battery.

In Fig. 8 I have shown a pipe with a coil of wire surrounding it, said wire being connected with a battery, M B, and a thermostat, Th. When the circuit is closed at the thermostat, a current will pass through the coil and produce a heating effect upon the pipe.

In Fig. 9 I have shown within the pipe heating-coils of wire included in an electric circuit. This may be a dynamo-circuit or electric-light circuit. A thermostat, Th, is included in the circuit so as to make and break the current according to the variations of temperature. When a strong electric current is made through the coils, the water in the pipes will be heated.

In Fig. 10 I have shown a section of pipe and an electric circuit, $x$, including a battery, M B, and thermostat Th. The circuit extends into the pipe, and is either connected with the metallic body of the pipe or with the water in the pipe so as to cause the electric current to flow through the pipe or the water in the pipe, as indicated by arrows. The effect of this arrangement is to heat the water, thereby preventing it from freezing.

Having thus described my invention, what I claim, and desire to secure by Letters Patent of the United States, is—

1. The combination, substantially as hereinbefore set forth, of a water-pipe, a source of heat arranged near the pipe, and means for automatically starting and applying the heat to the pipe.

2. The combination, substantially as hereinbefore set forth, of a water-pipe, a heat-generator arranged near the pipe, and a thermostat operatively connected with the heat-generator, whereby heat may be started and applied to the pipe when the temperature near the thermostat falls.

3. The combination, substantially as hereinbefore set forth, of a water-pipe, a gas-burner arranged in close proximity to the pipe, a thermostat for turning the burner off or on, and devices for lighting the gas.

4. The combination, substantially as hereinbefore set forth, of a water-pipe, a gas-burner, a pipe or passage over the gas-burner through which the heat from the burner passes, electrical apparatus for turning on the burner and lighting the gas, and a thermostat included in the electric circuit.

5. The combination, substantially as hereinbefore set forth, of a section of water-pipe having a connection with a water-main and connected at two points with the service-pipes of a building, a heat-generator arranged in said section of pipe, and devices for automatically applying the heat when the temperature in the surrounding atmosphere falls.

6. The combination, substantially as hereinbefore set forth, of a water-pipe, a heat-generator arranged near the pipe, an electric circuit for controlling the heat-generator, a thermostat included in the circuit, and a contact operatively connected with the thermostat to vary the electric current proportionately to the variations of the temperature.

7. The combination, substantially as hereinbefore set forth, of a water-pipe, a heat-generator arranged near the water-pipe, apparatus for turning the heat on or off, an electric circuit controlling said apparatus, and a thermostat included in the circuit for shifting it so as to turn the heat on or off.

8. The combination, substantially as hereinbefore set forth, of a water-pipe, an electric circuit passing in close proximity to the pipe, and a thermostat included in the circuit arranged to make and break the circuit according to variations in temperature.

9. The combination, substantially as hereinbefore set forth, of a section of water-pipe connected with a water-main and the service-pipes of a building, a gas-burner arranged near said pipe, an automatic electrical apparatus for turning the gas off or on and for lighting it, an electric circuit including a thermostat connected with said apparatus, a tubular passage for heat arranged within the section of water-pipe and over the gas-burner, a perforated disk or partition arranged just under the discharge-opening in the burner, and air-ports arranged under the disk.

In testimony whereof I have hereunto subscribed my name.

EDWIN A. NEWMAN.

Witnesses:
DUANE E. FOX,
V. W. MIDDLETON.